(12) United States Patent
Jiang et al.

(10) Patent No.: US 7,455,796 B2
(45) Date of Patent: *Nov. 25, 2008

(54) PROCESS FOR TRANSFERRING A COATING ONTO A SURFACE OF A LENS BLANK

(75) Inventors: Peiqi Jiang, Tarpon Springs, FL (US); Fadi O. Adileh, Largo, FL (US); Yassin Yusef Turshani, Largo, FL (US); Steven Weber, Clearwater, FL (US)

(73) Assignee: Essilor International Compagnie Generale d'Optique, Charenton Cedex (FR)

( * ) Notice: Subject to any disclaimer, the term of this patent is extended or adjusted under 35 U.S.C. 154(b) by 808 days.

This patent is subject to a terminal disclaimer.

(21) Appl. No.: 10/482,722

(22) PCT Filed: Jul. 1, 2002

(86) PCT No.: PCT/EP02/07239

§ 371 (c)(1),
(2), (4) Date: Jan. 2, 2004

(87) PCT Pub. No.: WO03/004255

PCT Pub. Date: Jan. 16, 2003

(65) Prior Publication Data

US 2004/0194880 A1    Oct. 7, 2004

Related U.S. Application Data

(63) Continuation-in-part of application No. 09/899,367, filed on Jul. 2, 2001, now Pat. No. 6,562,466.

(51) Int. Cl.
*B29D 11/00* (2006.01)

(52) U.S. Cl. .................. 264/1.7; 156/275.5; 156/275.7; 156/285; 156/295; 264/2.5

(58) Field of Classification Search .................. 264/1.1, 264/1.7, 2.5; 156/275.5, 275.7, 285, 295
See application file for complete search history.

(56) References Cited

U.S. PATENT DOCUMENTS 4,061,518 A    12/1977  Burroughs et al. .......... 156/232

(Continued)

FOREIGN PATENT DOCUMENTS

EP    0404111    6/1990

(Continued)

OTHER PUBLICATIONS

Owens, et al., "Estimation of the Surface Force Energy of Polymers," *J. Appl. Polym. Sci.*, 13:1741-1747, 1969.

(Continued)

*Primary Examiner*—Mathieu D. Vargot
(74) *Attorney, Agent, or Firm*—Fulbright & Jaworski L.L.P.

(57) ABSTRACT

A process for transferring a coating onto at least one optical surface of a lens blank which comprises:
  providing a lens blank having at least one geometrically defined surface;
  providing a support having an internal surface bearing a coating and an external surface;
  depositing on said geometrically defined surface of said lens blank or said coating a pre-measured amount of a curable glue;
  moving relatively to each other the lens blank and the support to either bring the coating into contact with the curable glue or bring the curable glue into contact with the geometrically defined surface of the lens blank;
  applying a sufficient pressure onto the external surface of the support so that the thickness of a final glue layer after curing is less than 100 micrometers;
  curing the glue; and
  withdrawing the mold part to recover the lens blank with the coating adhered onto its geometrically defined surface.

56 Claims, 3 Drawing Sheets

U.S. PATENT DOCUMENTS

| | | | |
|---|---|---|---|
| 4,064,518 A | 12/1977 | Douglas | 354/86 |
| 4,211,823 A | 7/1980 | Suzuki et al. | 428/412 |
| 4,242,162 A | 12/1980 | Ronning et al. | 156/212 |
| 4,374,158 A | 2/1983 | Taniguchi et al. | 427/536 |
| 4,425,403 A | 1/1984 | Taniguchi et al. | 428/331 |
| 4,927,480 A | 5/1990 | Vaughan | 156/228 |
| 5,015,523 A | 5/1991 | Kawashima et al. | 428/336 |
| 5,316,791 A | 5/1994 | Farber et al. | 427/164 |
| 5,512,371 A | 4/1996 | Gupta et al. | 428/412 |
| 5,851,328 A * | 12/1998 | Kohan | 156/102 |
| 6,003,515 A | 12/1999 | Maness | 128/857 |
| 6,242,065 B1 | 6/2001 | Blomberg et al. | 428/64.1 |
| 6,355,124 B1 | 3/2002 | Blomberg et al. | 156/99 |
| 6,503,631 B1 | 1/2003 | Faverolle et al. | 428/447 |
| 6,562,466 B2 | 5/2003 | Jiang et al. | 428/412 |
| 6,624,237 B2 | 9/2003 | Biteau et al. | 524/588 |
| 6,740,699 B2 | 5/2004 | Tardieu et al. | 524/481 |
| 6,770,710 B2 | 8/2004 | Robert et al. | 524/832 |
| 6,911,005 B2 | 6/2005 | Ouchi et al. | 600/121 |
| 6,919,134 B2 | 7/2005 | Mitsuishi et al. | 428/447 |
| 2002/0009546 A1 | 1/2002 | Koike et al. | 427/255.27 |
| 2003/0017340 A1 | 1/2003 | Jiang et al. | 428/412 |
| 2004/0065968 A1 | 4/2004 | Klemm et al. | 264/2.5 |

FOREIGN PATENT DOCUMENTS

| | | |
|---|---|---|
| EP | 0614957 | 9/1997 |
| EP | 0796719 | 9/1997 |
| EP | 1161512 | 2/2004 |
| EP | 1426168 | 2/2005 |
| JP | 63-087223 | 4/1988 |
| JP | 63-141001 | 6/1988 |
| JP | 08-090665 | 4/1996 |
| JP | 09-197107 | 7/1997 |
| JP | 2000-009905 | 1/2000 |
| WO | WO 93/21010 | 10/1993 |
| WO | WO 94/10230 | 5/1994 |
| WO | WO 95/13904 | 5/1995 |
| WO | WO 97/35216 | 9/1997 |
| WO | WO 99/24243 | 5/1999 |
| WO | WO 03/004255 | 1/2003 |

OTHER PUBLICATIONS

Sobieski et al., Handbook of Pressure-Sensitive Adhesive Technology, 2nd ed., D. Satas, ed., pp. 508-517.

Office communication issued in JP 2003-510246, dated Jul. 10, 2007.

* cited by examiner

PROCESS FOR TRANSFERRING A COATING ONTO A SURFACE OF A LENS BLANK

This application is a national phase application under 35 U.S.C. 0 371 of PCT Application No. PCT/EP02/07239 filed 1 Jul. 2002, which claims priority to U.S. application Ser. No. 09/899,367 filed 2 Jul. 2001, the contents of which are incorporated herein by reference in their entirety.

BACKGROUND OF THE INVENTION

The present invention relates to an improved process or method for transferring a coating onto at least one surface of a lens blank which can be implemented in a short period of time without any risk of deformation of the lens blank.

It is a common practice in the art to coat at least one face of an ophthalmic lens with several coatings for imparting to the finished lens additional or improved optical or mechanical properties.

Thus, it is usual practice to coat at least one face of an ophthalmic lens, typically made of an organic glass material, with successively, starting from the face of the lens, an impact resistant coating (impact resistant primer), a scratch resistant coating (hard coat), an anti-reflecting coating and, optionally, a hydrophobic top coat. Other coatings such as polarized coating, photochromic or dying coating may also be applied onto one or both faces of the ophthalmic lens.

Numerous processes and methods have been proposed for coating a face of an ophthalmic lens.

U.S. Pat. No. 4,061,518 discloses a process for fabricating an article having a replicated coating with a durable dielectric overcoat thereon which comprises forming onto an optically polished surface of a master a release layer, a protective coat and a reflective coat, applying a pre-measured amount of an epoxy resin adhesive on a face of a support member of casting, and thereafter transferring the coating from the master to the support member of casting by applying the coating face of the master to the epoxy resin adhesive, curing the epoxy resin adhesive under heat and withdrawing the master. The support member of casting is preferably an aluminium casting. The described method is particularly suited for making mirrors.

WO 99/24243 discloses a method of making a thermoplastic lens by placing a laminated layer/coating having the desired lens characteristics required for the prescription between a preheated lens blank and preheated mold halves and pressing the mold halves toward each other to compress the lens blank and uniformly apply the layer/coating thereon without any creases or cracks therein.

In this method, the lens molds are pressed toward each other and against the lens blank to immediately size down the lens blank and any laminations included therewith to its finished lens size with the desired layer coatings in few minutes. In fact, the lens blank and juxtaposed laminations are compressed at a predetermined programmed rate of speed, whereby the lens blank is compressed and spread out into the mold cavity with a layer/coating uniformally applied thereon.

In order to obtain the required geometry for the final lens, spreading of the blank must be carefully controlled and therefore heating and compression have also to be carefully controlled.

U.S. Pat. No. 5,512,371 discloses a composite plastic optical quality lens, comprising a plastic lens preform of optical quality material, and a cured plastic attached portion that is bonded to said plastic lens preform portion; said cured plastic attached portion having higher scratch resistance, and lower chromatic aberration than said plastic lens preform.

Such a lens is obtained by pouring a lens composition in a molding cavity delimited by a mold part and a lens preform and then curing said lens composition.

According to one preferred embodiment of U.S. Pat. No. 5,512,371, coatings may be provided on the resultant lens by transferring coatings from the mold to the resultant lens.

The purpose of U.S. Pat. No. 5,512,371 is to substantially modify and improve the mechanical properties of the plastic lens preform, generally made of bisphenol A polycarbonate. In particular, properties such as edging and chromatic aberration of the whole resultant lens are supposed to be significantly modified by the cured attached portion. Such results are achievable only for cured attached portions having a thickness globally in the same range or even higher than the thickness of the preform, taking into account that the usual center thickness of the final resultant lens is generally, as known in the art, of more than 1 mm.

If it was not the case, the modifications brought by the cured portion would have no significant effects on the properties of the composite lens such as chromatic aberration and edging.

WO 93/21010 also relating to the manufacture of composite lenses gives a minimum thickness for the preform.: 100 microns, with typical thickness of 0.5 to 1.5 mm.

In general, it is difficult to manufacture and handle preforms that are less than 500 microns thickness.

Based on the above elements, it is clear that thicknesses for the cured attached portion of U.S. Pat. No. 5,512,371, even if not specifically mentioned, are typically around 0.5 mm or above.

According to the method of manufacture described in U.S. Pat. No. 5,512,371, a resin is poured in a mold and a lens polycarbonate preform is placed on the top of the resin filled mold, slight pressure is applied to squeeze out excess resin until a carrier of sufficient thickness is obtained.

The assembly lens/preform/mold part is held together with the capillary action of the resin material and the weight of the lens preform.

WO 97/35216 discloses a process for transferring a multilayer coating onto the surfaces of a lens which comprises:

providing a thin polymeric film substrate which is flexible and extensible and having one face coated with the transferable multilayer coating;

placing the coated film substrate in an apparatus including a film deforming member;

disposing a drop of an adhesive between the film substrate and a lens surface;

urging the film into conforming engagement with a surface of the lens; and curing to adhere the multilayer coating on the lens surface.

In this process, the film substrate is stretched to conform to the surface of the lens, thereby stretching the multilayer coating. Stretching shall in fact be avoided because it entails a high risk of tearing and/or cracking the layers of the multilayer coating, in particular mineral layers such as conventional antireflective layers.

SUMMARY OF THE INVENTION

It is an object of the invention to provide a process or a method for transferring a coating from a support onto at least one surface of a lens blank which does not entail any deformation of the lens blank.

It is an additional object of this invention to provide a process or a method for transferring a coating from a support onto at least one surface of a lens blank which further does not necessitate the use of specific mold parts for each prescribed final lens geometry.

In accordance with the above objects and those that will be mentioned and will become apparent below, the process or method for transferring a coating from at least one mold part onto at least a geometrically defined surface of a lens blank comprises:

providing a lens blank having at least one geometrically defined surface;

providing a support having an internal surface bearing a coating and an external surface;

depositing on said geometrically defined surface of said lens blank or on said coating a pre-measured amount of a curable glue;

moving relatively to each other the lens blank and the support to either bring the coating into contact with curable glue or bring the curable glue into contact with the geometrically defined surface of the lens blank;

applying a sufficient pressure onto the external surface of the support so that the thickness of a final glue layer after curing is less than 100 micrometers;

curing the glue; and withdrawing the support to recover the lens blank with the coating adhered onto the geometrically defined surface of said lens blank.

By premeasured amount, one means a sufficient amount of glue to obtain transfer and adhesion of the coating to the lens blank.

In one embodiment of the process of the invention, the pre-measured amount of the curable glue may consist in the external layer of the coating itself, in particular an impact-resistant primer layer of the coating to be transferred. This could be the case when the impact-resistant primer layer comprises UV polymerizable (meth)acrylate monomers. It can also be the anti-abrasion layer, in particular when no primer layer is to be transferred to the blank.

It also can be the external layer of an anti-reflective coating, in particular when only such an anti-reflective coating is being transferred. In that case, of course, the anti-reflective coating is deposited in a liquid form.

In an other embodiment of the inventive process an adhesive primer layer may be deposited on the blank, prior to the deposition of the pre-measured amount of the curable glue.

Of course, the pre-measured amount of curable glue can be deposited in any appropriate form such as in the form of a drop or of a layer.

By geometrically defined surface of the lens blank or of a mold part, there is meant either an optical surface, that is a surface of required geometry and smoothness or a surface having a required geometry but that may still exhibit some roughness, such as a lens blank that has been grinded and fined, but not polished to the required geometry. The surface roughness typically ranges from Sq $10^{-3}$ μm to 1 μm, preferably from $10^{-3}$ to 0.5 μm and most preferably from $10^{-3}$ to 0.1 μm.

By optical surface, there is meant a surface of the lens blank or of a mold part that has been ground, fined and polished or molded to required geometry and smoothness.

An important feature of the process of the present invention is that the transfer of the coating onto the geometrically defined surface of the lens blank is performed without any substantial compression of the blank and thus without any risk of deformation of the blank geometry and in particular of the geometrically defined surfaces thereof.

Nevertheless, the pressure exerted on the external surface of the support is preferably substantially maintained at least up to the gelling of the glue. Maintaining the pressure can be effected through the use of an inflatable membrane placed on the external surface of the support.

Preferably, the applied pressure ranges from 5 to 50 Psi (0.35 to 3.5 kgf/cm$^2$), and more specifically 0.3 to 3 kgf/cm$^2$.

Most preferred range is 5 to 20 Psi (0.35 to 1.40 kgf/cm$^2$).

Using the above described process, coatings may be transferred successively or simultaneously to both front and rear geometrically defined surfaces of the lens blank. The transfer of the coatings may also be performed only to one side of the lens blank, preferably to the back side (or rear side).

The coating support or carrier may simply be a thin supporting film made of an appropriate material such as a plastic material, for example a polycarbonate film. The coating support is preferably a mold part made of any appropriate material, preferably made of a plastic material especially a thermoplastic material and in particular of polycarbonate.

The working surface of the mold part may have a relief organized according to a pattern, in other words, may be microstructured and may confer to the final lens an optical surface having the properties imparted by the microstructure (for example antireflective properties).

Different techniques for obtaining a microstructured mold part are disclosed in WO99/29494.

The mold part or carrier may be obtained by using known processes such as surfacing, thermoforming, vacuum thermoforming, thermoforming/compression, injection molding, injection/compression molding.

The mold part may be rigid or flexible, but is preferably flexible. Using rigid mold parts necessitates to have a large number of mold parts each comprising a geometrically defined surface whose geometry is adapted to a specific geometry of the geometrically defined surface of a lens blank. In order to avoid the necessity of having such a huge number of different mold parts, the mold part is preferably a flexible mold part, in particular a flexible mold part made of a plastic material such as polycarbonate. When using this flexible mold part it is only necessary to provide the mold part with a surface the geometry of which conforms to the general shape of the optical surface of the lens blanks onto which the coating is to be transferred, either a concave or convex shape, but it is not necessary that this surface strictly corresponds to the geometry of the lens blank surface to be coated. Thus, the same mold part can be used for transferring coatings onto lens blanks having surfaces of different specific geometries. Generally, the flexible mold part has two parallel main surfaces and consequently has an even thickness.

The coating bearing surface of the flexible mold is preferably spherical.

Flexible mold parts would typically have a thickness of 0.2 to 5 mm, preferably of 0.3 to 5 mm. More preferably, the flexible mold part is made of polycarbonate, and in this case the thickness is from 0.5 to 1 mm.

The inventors have found that the best embodiments of the invention are achieved if specific requirements regarding the base curvatures of the mold part and lens blank are fulfilled.

In this patent application, when one refers to the base curvature of the mold part, one means the base curvature of the working surface of the mold part, that is to say the surface which bears the coatings to be transferred to the lens or lens blank.

In the same way, base curvature of the lens or lens blank means the base curvature of the surface to which the coatings are going to be transferred from the above cited mold part.

In this application, the base curvature has the following definition:

For a spheric surface, having a radius of curvature R,

Base curvature(or base)=530/$R$($R$ in mm);

such kind of definition is quite classical in the art

For a toric surface, there are two radii of curvature and one calculates, according to the above formula, two base curvatures $B_R$, $B_r$ with $B_R < B_r$.

For a coating transfer to a spherical back side of a lens or lens blank, in order to avoid distortions, in particular when using a flexible mold part, the base curvature (BC) of the flexible mold part (front side) must be slightly higher than the base curvature (BL) of the geometrically defined surface of the lens or the lens blank on which the coating is to be transferred. However, BC shall not be too high in order to avoid cracking of the coating during the transfer process or an optical power outside tolerance of Z801 after the transfer.

Typically, for a spheric lens or lens blank, base curvature BL of the lens or lens blank and base curvature BC of the flexible mold part shall satisfy the relationship:

$0 < BC - BL < 1.5$

Preferably $0.2 < BC - BL < 1$

For a coating transfer to a toric back side of a lens or a lens blank (cylindric lens or lens blank), having two principal meridians, of radii R and r with R>r, it is possible to calculate two base curvatures $BL_R$ and $BL_r$ corresponding respectively to radii R and r defining the toric surface.

Base curvatures of the lens $BL_R$ and $BL_r$ and the base curvature of the flexible mold part shall satisfy the following relationship:

$BL_R < BL_r$ a) if $\quad BL_r - BL_R \leq 3.5$ $$\left. \begin{array}{l} 0 < BC - BL_R < 3 \\ |BC - BL_r| < 1 \end{array} \right\}$$

preferably $$\left. \begin{array}{l} 0.2 < BC - BL_R < 2.5 \\ |BC - BL_r| < 0.5 \end{array} \right\}$$

b) if $\quad BL_r - BL_R > 3.5$ $\quad BL_R < BC < BL_r$

When using a rigid mould part, preferably the base curvature of the mould part (BC) is the same as the base curvature of the lens or lens blank (BL).

Preferably, when moving relatively to each other the mold part and the blank, the contact between coating(s) and curable glue or between curable glue and lens blank geometrically defined surface occurs respectively in the center area of the coated mold part or in the center area of the lens blank geometrically defined surface.

In particular in the case of a flexible mold part, the convex front face of the mold part may have a shorter radius of curvature than the concave surface of the blank to be coated. Thus, pressure is applied at the center and the mold part is then deformed to conform to the blank surface. The glue layer is formed starting from the center of the blank, which avoids entrapping air bubbles within the final cured glue layer. The same will be true using the concave surface of a mold part of longer radius of curvature than a convex blank surface to be coated.

As previously mentioned, transfer from a flexible mold part may be effected using an inflatable membrane.

The inflatable membrane can be made of any elastomeric material which can be sufficiently deformed by pressurization with appropriate fluid for urging the flexible mold part against the lens or lens blank in conformity with he surface geometry of the lens or the lens blank.

The inflatable membrane can be made of any appropriate elastomeric material. Typically, the inflatable membrane has a thickness ranging from 0.50 mm to 5.0 mm and an elongation of 100 to 800%, and a durometer 10 to 100 Shore A.

If the glue is thermally cured, then the material of the inflatable membrane shall be selected to bear the curing temperature.

If the glue is UV cured, then a transparent material shall be selected, for example a transparent silicone rubber or other transparent rubbers or latexes: the UV light is preferably irradiated from the mold side.

The pressure applied to the mold part by the inflatable membrane will preferably range from 30 kPa to 150 kPa and will depend on the lens or lens blank and flexible mold part sizes and curvatures. Of course, the pressure needs to be maintained onto the flexible mold part and the lens or lens blank until the glue or adhesive is sufficiently cured so that enough adhesion of the coating to the lens or lens blank is obtained.

The lens blank can be a lens having one or both of its faces surfaced or casted to the required geometry. (A lens having only one of its faces surfaced or casted to the required geometry is called a semi-finished lens).

Preferably, the lens blank has a first face conferring progressive power and a second face conferring non-progressive power, but of spherical or torical shape onto which coating transfer according to the invention process is preferably performed. Preferably, the progressive face is the front face of the blank.

The lens blank can also be a semi-finished lens wherein one face of the lens, preferably the front face of the lens has previously been treated with an appropriate coating (antireflective, hard coat, etc . . . ) and the remaining face, preferably the rear face, of the lens is coated using the transfer process of the invention. The lens blank can be a polarized lens.

The lens blank can be pre-treated before applying the method of the invention.

The pre-treatment can be physical such as a plasma treatment or chemical such as a solvent treatment or a NaOH treatment.

The transferred coating may comprise any coating layer or stack of coating layers classically used in the optical field, such as an anti-reflective coating layer, an anti-abrasion coating layer, an impact resistant coating layer, a polarized coating layer, a photochromic coating layer, an optical-electronical coating, an electric-photochromic coating, a dying coating layer, a printed layer such as a logo or a stack of two or more of these coating layers.

According to a preferred embodiment of the invention, it is transferred to the geometrically defined surface of the lens blank a stack comprising:

optionally, a hydrophobic top coat;

an antireflective stack, generally comprising inorganic material such as metal oxide or silica;

a hard coat, preferably comprising a hydrolyzate of one or more epoxysilane(s) and one or more inorganic filler(s) such as colloidal silica;

optionally, an impact strength primer, preferably a polyurethane latex or an acrylic latex; each of the layers of the stack being deposited onto the support in the above recited order.

The method of the invention is particularly interesting for transferring the whole stack comprising "top coat, antireflective coat, hard coat and primer coat".

Generally the thickness of the antireflective coat or stack ranges from 80 nm to 800 nm and preferably 100 nm to 500 nm.

The thickness of the hard coat preferably ranges from 1 to 10 micrometers, preferably from 2 to 6 micrometers.

The thickness of the primer coat preferably ranges from 0.5 to 3 micrometers.

Typically, the total thickness of the coating to be transferred is 1 to 500 µm, but is preferably less than 50 µm, more preferably less than 20 micrometers, or even better 10 µm or less.

The glue or adhesive may be any curable glue or adhesive, preferentially a thermally curable or photocurable, in particular UV curable, glue or adhesive that will promote adhesion of the coating to the optical surface of the blank without impairing the optical properties of the finished lens.

Some additives such as photochromic dyes and/or pigments may be included in the glue.

Although the liquid glue or adhesive is preferably dispersed at the center, it can be dispersed in a random pattern, spread out firstly via spin coating, or sprayed using a precision dispensing valve. By even layer distribution, it is meant that the variation of thickness of the glue or adhesive layer, once cured, has no consequence on the optical power of the final lens.

The curable glue or adhesive can be polyurethane compounds, epoxy compounds, (meth)acrylate compounds such as polyethyleneglycol di(meth)acrylate, ethoxylated bisphenol A di(meth)acrylates.

The preferred compounds for the curable glue or adhesive are acrylate compounds such as polyethyleneglycoldiacrylates, ethoxylated bisphenol A diacrylates, various trifunctional acrylates such as (ethoxylated) trimethylolpropane triacrylate and tris(2-hydroxyethyl)isocyanurate.

Monofunctional acrylates such as isobornylacrylate, benzylacrylate, phenylthioethylacrylate are also suitable.

The above compounds can be used alone or in combination.

Preferably, when cured, the glue layer has an even thickness. Suitable glues are commercially available from the Loctite Company.

As previously mentioned, the thickness of the final glue layer after curing is less than 100 µm, preferably less than 80 µm, most preferably less than 50 µm and usually 1 to 30 µm.

The lens blank may be made of any material suitable for making optical lenses but is preferably made of a plastic material and in particular of diethyleneglycol bis-allylcarbonate copolymer (CR-39® from PPG INDUSTRIES), polycarbonate (PC), polyurethane, polythiourethane, episulfide ultra-high index materials, optionally containing photochromic compounds.

The final lenses obtained by the method of the invention have very good optical quality and they have no or very low level of interference fringes.

BRIEF DESCRIPTION OF THE DRAWING

The foregoing and other objects, features and advantages of the present invention will become readily apparent to those skilled in the art from a reading of the detailed description hereafter when considered in conjunction with the accompanying drawings wherein.

DETAILED DESCRIPTION OF THE PREFERRED EMBODIMENT

Although the following description makes reference to the use of the preferred flexible mold part, it shall be understood that the described process can also be implemented using rigid mold parts.

Figure 1A:
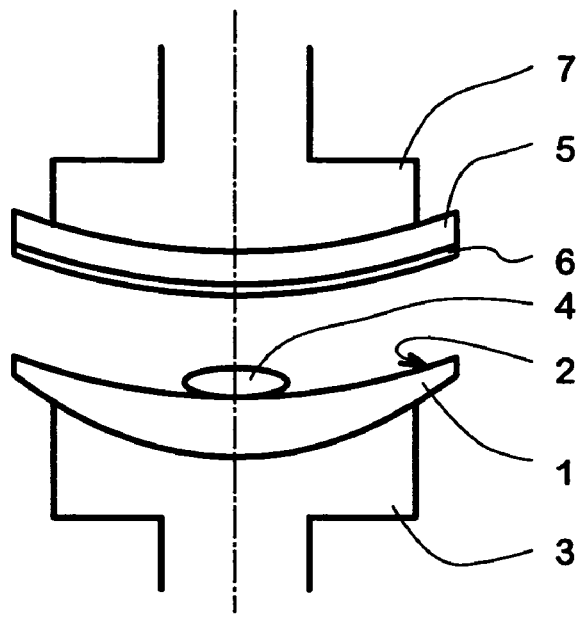
FIGS. 1A to 1C are schematic views of the main steps of a first embodiment of the process of the invention for transferring a coating onto an optical surface of a lens blank.
Figure 1B:
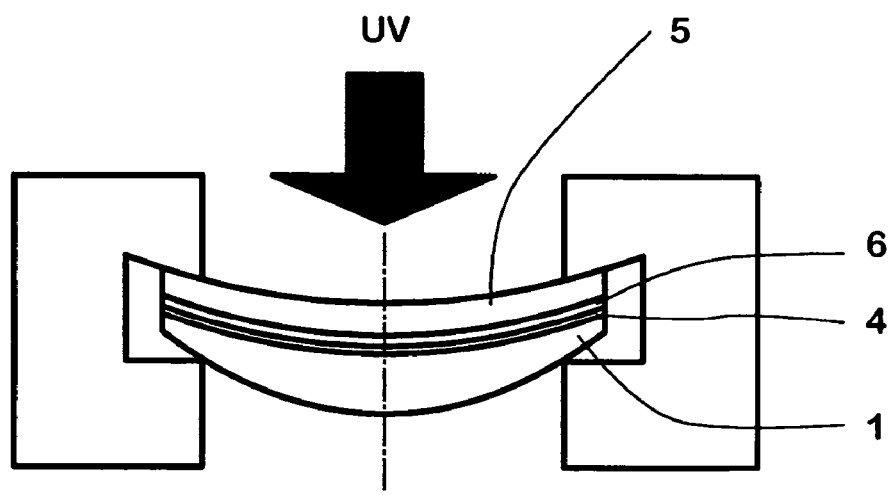
Figure 1C:
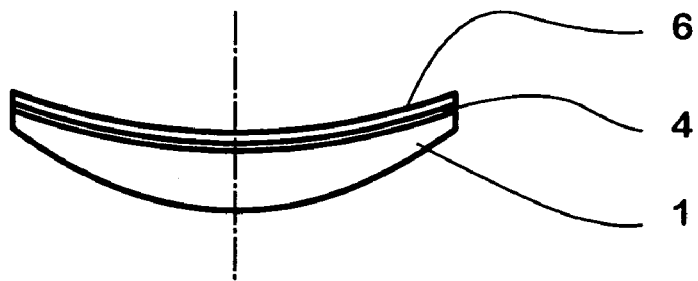

Referring now to the drawings and in particular to FIGS. 1A to 1C, a lens blank 1 having a concave surface 2 is placed on a supporting element 3 with its concave surface 2 facing upwardly. A pre-measured drop of a UV curable glue 4 is then deposited onto the surface 2 of the lens blank 1. A flexible mould part 5 having a convex optical surface, which has been previously coated with a prescribed coating 6, is placed onto a supporting element 7 with its surface bearing the optical coating facing downwardly.

Deposition of coating 6 on the surface of the flexible mold part 5 can be done through any usual deposition process employed in the optical field, such as vacuum deposition, spin coating, brush coating, dip coating etc . . . Of course, the deposition process will depend on the nature of the coating layer or layers deposited on the surface of the flexible mold part 5.

Thereafter the supporting elements 3, 7 are moved relatively to each other to bring into contact coating 6 and UV curable glue drop 4 and a pressure is exerted to the external surface of the mold part opposite to the coating in such a manner that the UV curable glue drop will spread on the surface 2 of the lens blank 1 and on the coating 6. However, the exerted pressure shall only be sufficient for spreading the drop of glue in order to obtain the required thickness for the final cured glue film but insufficient to impart any deformation to the lens blank 1.

As shown in FIG. 1B, the assembly formed by the lens blank 1, the glue film 4, the coating 6 and the mold part 5 is then placed into a device for UV curing the glue film 4. After curing of the UV film 4, the mold part 5 is withdrawn and a blank 1 having a coating 6 adhered onto its concave surface 2 is recovered as shown in FIG. 1C.

Figure 2A:
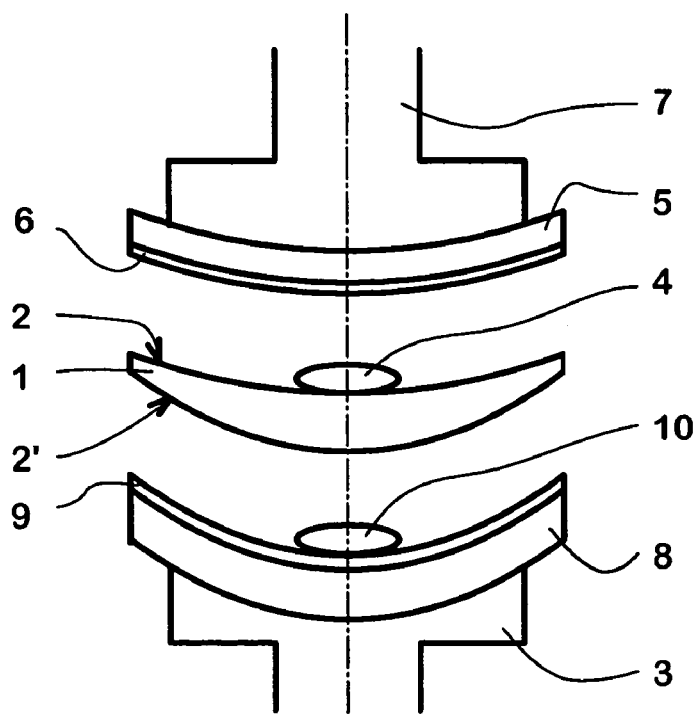
FIGS. 2A to 2C are schematic views of the main steps of a second embodiment of the process of the invention wherein coatings are simultaneously transferred to both optical surfaces of a lens blank.
Figure 2B:
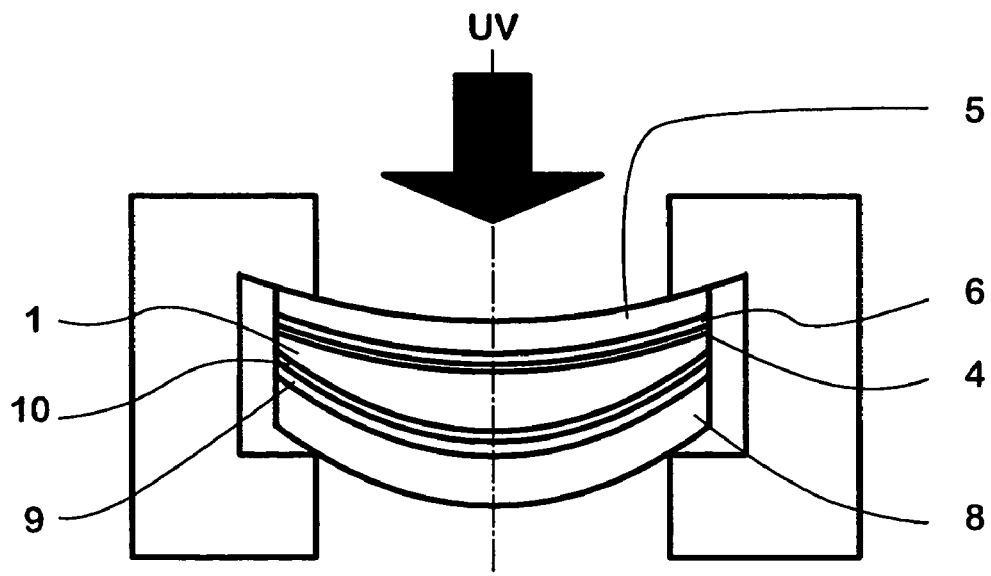
Figure 2C:
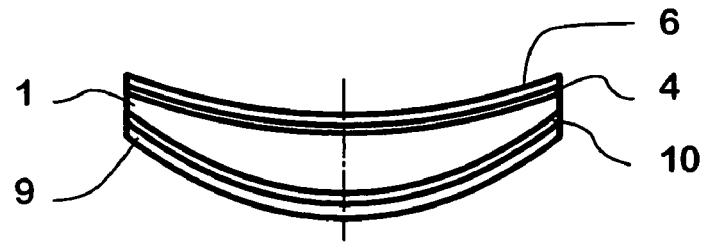

Referring now to FIGS. 2A to 2C, there is shown a similar process as described in connection with FIGS. 1A to 1B but in which both surfaces of lens blank 1 are coated with a coating by the transfer method of the invention.

As shown in FIG. 2A, a flexible mould part 8, for example a mould part made of polycarbonate having a thickness of 1 mm, whose concave surface has been previously coated with an optical coating 9 is placed onto a supporting element 3. A pre-measured drop 10 of a UV curable glue is then deposited onto coating 9. A lens blank 1 is then placed on mold part 8 with its convex surface 2' in contact with glue drop 10. A pre-measured UV curable glue drop is then deposited on concave surface 2 of lens blank 1. A flexible mold part 5, for example a polycarbonate mold part of 1 mm thickness, whose convex surface has been previously coated with an optical coating 6 is placed on a supporting element 7. Supporting elements 3, 7 are then moved relatively to each other to bring coating 6 into contact with glue drop 4 and a pressure is exerted on at least the external surface of one of the mold part to spread the glue drops 4 and 10 to form glue films. As indicated previously, the pressure exerted must only be sufficient to spread the glue drops and form glue films of required thicknesses after curing but insufficient to create any deformation in the lens blank 1.

Thereafter, the assembly formed by the mold parts, optical coatings, glue films and lens blank is placed into a UV curing device where the glue films 4, 10 are UV cured.

After completion of curing of the glue films, mold parts 5 and 8 are withdrawn and a finished lens having optical coatings 5, 6 adhered to both surfaces of the lens blank 1 is recovered, as shown in FIG. 2C.

Figure 3A:
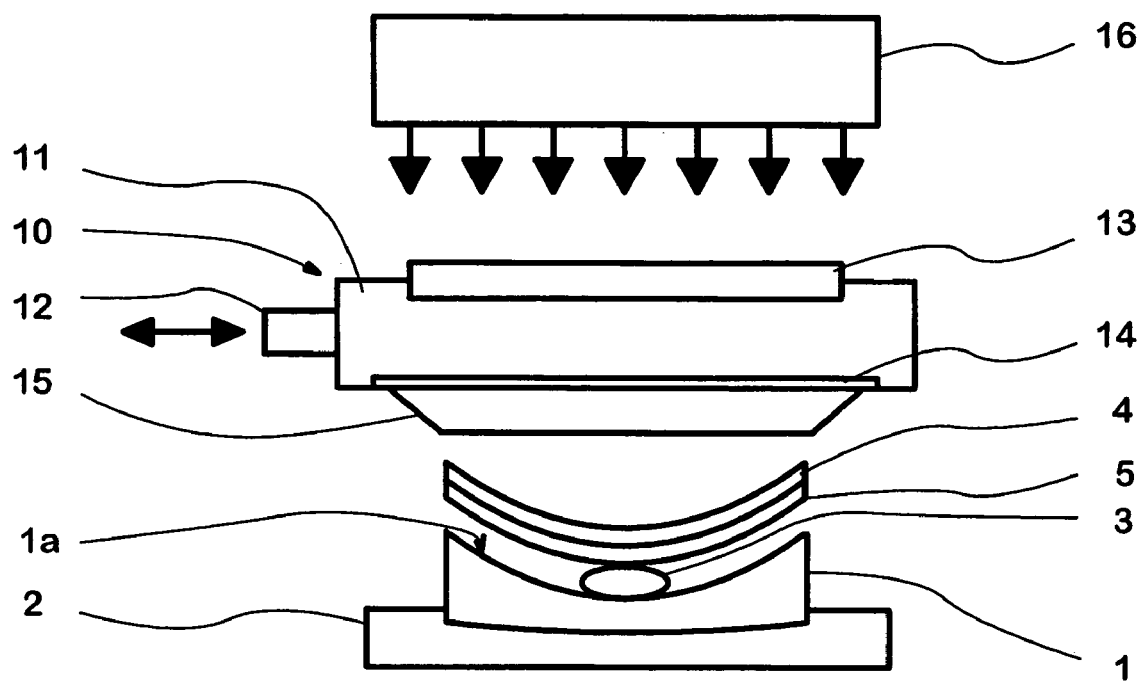
FIGS. 3A and 3B are schematic views of the main steps of a third embodiment of the process of the invention using a new inflatable membrane apparatus.
Figure 3B:
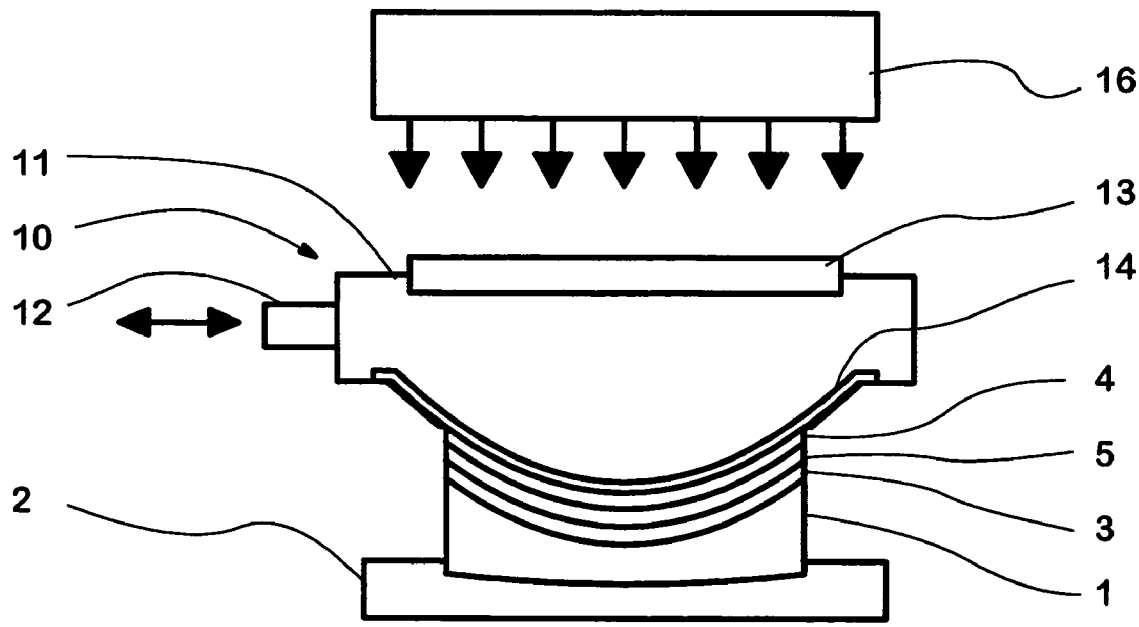

FIGS. 3A and 3B are schematic views of a third embodiment of the process of the invention in which the transfer of the coating is performed using a flexible mold part or carrier which is urged against the lens blank surface using an inflatable membrane.

FIG. 3A shows the lens blank, flexible carrier and inflatable membrane before pressurization and inflation of the membrane, whereas FIG. 3B shows the same after pressurization and inflatation of the membrane.

Although, the following description will be made in connection with UV curing of the adhesive, similar apparatus and process can be used using a thermally curable adhesive.

Referring to FIG. 3A, a lens blank 1, for example a toric lens blank is placed in a lens blank support with its geometrically defined surface 1a facing outwardly.

A drop of liquid transparent adhesive 3 is deposited at the center of the geometrically defined surface 1a of the lens blank 1.

A thin flexible carrier 4, for example a spheric carrier, having a tansferable coating 5 deposited on one of its faces, is placed on the adhesive drop 3 so that the transferable coating 5 is in contact with the adhesive drop 3. The base curvature of the flexible carrier 4 is slightly higher than the base curvature of the geometrically defined surface 1a of lens blank 1.

The whole assembly is placed in front of an inflatable membrane apparatus 10.

The inflatable membrane apparatus 10 comprises a fluid accumulator 11, for example an air accumulator provided with fluid port 12, for example an air port connected to a pressurized fluid source (not represented) for introducing pressurized fluid within the accumulator and also evacuating pressurized fluid from the accumulator. The upper face of the accumulator 10 comprises a light transparent portion 13, for example a UV transparent quartz glass portion, whereas the lower face of the accumulator 10 comprises a transparent inflatable membrane 14 in register with the transparent quartz glass 13.

As shown in FIG. 3A, the apparatus 10 further comprises a guiding means 15 for laterally guiding the inflatable membrane 14 during inflatation thereof. More specifically, this guiding means 15 comprises a trunconical part or funnel 15 projecting outwardly from the lower face of the accumulator 10 and whose greater base is obturated by the inflatable membrane and whose smaller base is a circular opening having a diameter at least equal to the base diameter of the flexible carrier 4 but preferably slightly larger (up to 5 mm larger . . . ).

Typically, the funnel height will range from 10 to 50 mm, preferably 10 to 25 mm, and will have a taper of 10 to 90°, preferably 30 to 50°.

Finally, a light source, for example a UV light source 16 is placed behind the accumulator 10 in front of the transparent quartz plate 13.

Generally, the assembly comprising the lens blank holder 2, the lens blank 1, the adhesive drop 3 and the flexible carrier 4 is placed so that the rim of the flexible carrier 4 be within the plan of the rim of the smaller base opening of funnel 15 or separated therefrom by a distance up to 50 mm, preferably up to 20 mm.

As shown in FIG. 3B, a pressurized fluid, such as pressurized air, is introduced into the accumulator 11 from an external source (not represented) through entrance 12. The pressure increase within the accumulator, inflates the inflatable membrane 14 and, thanks to the membrane guiding means 15, the membrane 14 uniformly urges the flexible carrier against the lens blank 1, while uniformly spreading the adhesive 3.

The adhesive is then UV-cured.

After completion of the curing step, the lens blank 1 is disassembled from the holder 2 and the flexible carrier 4 is removed to recover a lens blank 1 whose geometrically defined surface 1a bears the transferred coating 5.

Of course, in case of a thermal curing process, light source and transparent portion of the upper face of the accumulator are not needed.

In this case also, the inflatable membrane needs not to be transparent. Otherwise, the apparatus remains the same.

Using the funnel type of apparatus just described, a good coating transfer is obtained, with good optical quality meeting the America Optical Laboratory Standard (ANSI Z80.1-1987) as far as the power, cylinder, prism and distortion are concerned.

The membrane guiding means (funnel) is very important to let the membrane expand in good shape and direction for applying an even pressure on the flexible carrier through the lens blank without any extra pressure on the carrier and lens blank edges.

The following examples illustrate the process of the present invention.

EXAMPLE 1

The convex side with base curve 6 of a flexible mold part made of polycarbonate (PC) and having a thickness of 1 mm is pre-coated with HMC coating. Orma SF[(1)] lenses were surfaced on their back side to different curves of surface as indicated in Table I below. Then the HMC coating on the mold part was transferred to the surface back side of the lenses in the manner described in connection with FIGS. 1A to 1C. The glue used was a UV curable glue OP-21 from DYMAX Inc. After the curing, the mold part was removed from the lenses and the lenses were recovered with the coating stuck on their back sides. The finished coated lenses have very good optical properties and the transfer coatings show no cracks even though the coatings were deformed to a certain level during the transfer.

(1) SF: Semi-finished

TABLE I

| Coating PC mold part | Orma lens with different back curve | BLR | BLr | Coating transfer results |
|---|---|---|---|---|
| Spheric CV 6 Base | 5 base with toric 0.9 | 5 | 5.9 | Excellent |
| Spheric CV 6 Base | 5 base with toric 0.2 | 5 | 5.2 | Excellent |
| Spheric CV 6 Base | 6 base with toric 0.9 | 6 | 6.9 | Excellent |
| Spheric CV 6 Base | 6 base with toric 0.2 | 6 | 8 | Excellent |

EXAMPLE 2

Example 1 was reproduced but using a soft silicone mold part instead of a PC mold part. The resulting final coated lenses exhibited very good optical properties and the coatings do not show any cracks even though the coatings were deformed to a certain level during the transfer.

The silicone mold part used was made from POR-A-MOLD 2030 of Synair Inc. The silicone monomer was filled into a glass mold and cured at room temperature for 24 hours to get a front 4 base curve carrier with thickness of 2.5 mm. The obtained silicon has 900% elongation and 28 of Shore A Hardness.

EXAMPLE 3

Orma SF lenses were ground to different levels on their back side with 6 base curves and coatings were transferred to the back side of the lenses as disclosed in example 1. After transfer of the coating, the finished coated lenses were checked by transmission T, Haze with Haze-Gard Plus (BYK Gardner) (compared to the sample before transfer of the coating). Then, the lens were checked again in Arc lamp to see if there was any grinding lines seen by the eye. Grinding process and results are given in Table II below:

The measurement condition was under 2 μm tip 1 mg force 10 scans 500 μm long 2000 data points.

(1) V95+fine=standard grinding process before polishing (2) A new grinding process developed by Gerber Coburn Inc.

V-95+fine W: V95 is a computer controlled generate machine from LOH company and fine W is another fining machine (Toro-X-2SL) from LOH company (in current process, the SF lens need to be generated by V-95 and then be fined by Toro-X-2SL and go to polishing process to get a Rx lens, so here we save the polishing process).

The Gemini® process is the new smoothing generating and fining machine developed by Gerber Coburn Inc. for polycarbonate lenses. This process can achieve better smoothing than Toro-X-2SL of LOH's fining machine. By using the Gemini® smoothing machine, the Rx prescription lens could be coated to save polishing.

EXAMPLE 4

Example 3 was reproduced except that polycarbonate SF lenses were used instead of the Orma® SF lenses. Grinding process and results are given in Table 2.

EXAMPLE 5

A PC plano lens and an anti-reflective (AR) pre-coated PC mold with the same curve as the lens were fixed as the above scheme and a small amount of UV curable glue was put in between the PC lens and the mold with the AR film and then pressed/clipped to get uniform glue layer between the PC lens and the coated mould. The glue used was a polyurethane

TABLE II

HMC film transferred onto grind surface of the lens (without polishing)

| Lens type | Grind process type | T % (before) | Haze (before) | Roughness before transferring the coating(s) (Sq) | Refractive index of glue | T % (after) | Haze (after) | Seen in Arc lamp |
|---|---|---|---|---|---|---|---|---|
| Orma ® | V95 + fine w/ standard process[1] | 90 | 90 | 0.4 μm | 1.505 | 98 | 0.73 | Nothing |
| PC | Gemini Process[2] | 91 | 3.5 | 0.03 μm | 1.505 | 95 | 0.42 | Nothing |

Sq: Quadratic mean of the deviations from the mean $$Sq = \sqrt{\frac{1}{NM} \sum_{x=1}^{N} \sum_{y=1}^{M} Z_{x,y}^2}$$

Computes the efficient value for the amplitudes of the surfaces (RMS). This parameter is included in the EUR 15178 EN report (Commission of the European Communities) Stout et Al 1993: The development of methods for the characterisation of roughness in three dimensions.

The roughness (Sq) was measured by P-10 Long Scan of KLA-Tencor.

(meth)acrylate oligomer mixture with photoinitiator from DYMAX CORPORATION (OP-4-20628). The index of the glue is 1.477. Then, it was cured by a Fusion UV conveyor (9 mmH Bulb, 692 mW/cm$^2$ in 350 nm, Fusion UV Systems, Inc) for about 1 minute. After that, the two joined parts with the glue were edged and separated to get the PC lens with an AR film layer transferred from the mold. The AR film on the PC lens was checked by Arc Lamp and showed all the AR film was perfectly transferred from the mold to the lens. The reflectance of the obtained PC lens with the AR layer is under 0.5% in 550 nm. There was no fringes seen under the lamp between the AR film and the PC lens.

(Reflectance was measured by SMR 501 using a Zeiss MCS 501 type spectrophotometer).

EXAMPLE 6

Same as Example 5, except a −2.00 polythiourethane lens (Thin & Lite® lens with index of 1.60) was used with the same glue and same process. The obtained lens has the same AR properties as Example 5.

EXAMPLE 7

A PC piano lens and an AR/hardcoating & primer films (HMC) pre-coated plastic mold with the same curve as the lens were fixed as the above scheme and a small amount of UV curable glue was put in between the PC lens and the mold with the AR film and then pressed/clipped to get uniform glue layer adhered to the PC lens and the coated mold. The glue used was a polyurethane (meth)acrylate oligomer mixture with photoinitiator from DYMAX CORPORATION (OP-4-20628). The index of the glue is 1.477. Then, it was cured by a Fusion UV conveyor (9 mmH Buld, 692 mW/cm$^2$ in 350 nm, Fusion UV Systems, Inc) for about 1 minute. After that, the two joined parts with the glue were separated to get the PC lens with an AR film layer transferred from the plastic mold. The AR film on the PC lens was checked by an Arc Lamp and showed all the AR film was perfectly transferred from the mold to the lens. The reflectance of the obtained PC lens with the AR layer is under 0.5% in 550 nm (Reflectance is measured as in example 5). No fringes seen under the lamp between the AR film and the PC lens.

EXAMPLE 8

A −2.00 Thin & Lite® uncoated lens (ne=1.60) was fixed by a pair of HMC pre-coated plastic mold which have the same curve base as the lens, and then it was glued and cured as above to get a HMC coated high index lens. The obtained HMC lens has no fringes and the reflectance is under 1.0%.

EXAMPLE 9

A −4.25 ultra-high index lens substrate based on episulfide (ne=1.74) was fixed with HMC pre-coated plastic mold same as done for Example 3. The obtained HMC lens has no fringes and the reflectivity is under 0.5%. The adhesion test by cross hatch showed 100% adhesion. Thickness of the different layers was measured by microscopy, where the thickness of the glue is about 20 μm and the hard-coat layers are about 4-5 μm and AR layers are <1 μm.

Adhesion Test

Dry adhesion test was measured by cutting through the coating a series of 10 lines, spaced 1 mm apart, with a razor, followed by a second series of 10 lines, spaced 1 mm apart, at right angles to the first series, forming a crosshatch pattern. After blowing off the crosshatch pattern with an air stream to remove any dust formed during scribing, clear cellophane tape was then applied over the crosshatch pattern, pressed down firmly, and then rapidly pulled away from coating in direction perpendicular to the coating surface. Application and removal of fresh tape was then repeated two additional times. The lens was then submitted to tinting to determine the percentage adhesion, with tinted areas signifying adhesion failures.

EXAMPLE 10

Same as Example 7, except using another glue (OP-21 from Dymax Corp.). The results were the same as in Example 7.

EXAMPLE 10a

Same as Example 7, except using the following glue formulation: 40 wt % ethoxylated (4) bisphenol A diacrylate, 60 wt % neopentylglycol diacrylate, 3 parts per hundred parts of resin of Irgacure 819® photoinitiator.

The results were the same as in example 7 and a very good adhesion between the PC lens and the HMC film was obtained.

EXAMPLE 10b

Same as Example 7, except using the following glue formulation: 40 wt % trimethylolpropanetriacrylate, 30 wt % diethyleneglycol diacrylate, 30 wt % ethoxylated (4) bisphenol A diacrylate, 3 parts per hundred parts of resin of Irgacure 819® photoinitiator.

The results were the same as in example 7 and a very good adhesion between the PC lens and the HMC film was obtained

EXAMPLES 11 to 16

HMC coatings comprising a hydrophobic top coating layer, an anti-reflective layer, an anti-abrasive coating and an impact and/or adhesion enhancing layer as specified above are deposited on the convex surface of different flexible carriers and were transferred to geometrically defined backside surfaces of lenses using the process and apparatus as defined in connection with FIGS. 3A and 3B.

The materials used, apparatus and process conditions are defined hereinunder:

1) Flexible mold part (carrier)
   Polycarbonate (thickness 0.5 mm)
      base curvature (BC) 6, 8 or 11,
      diameter of the flexible mold part (periphery) 68 mm.
2) Lenses:
   CR39®, peripheral diameter 70 mm, lenses, backsides with base curvatures as indicated in table III below,
   power as indicated in table III below.
3) Liquid adhesive:
   UV curable liquid adhesive: OP-21 from DYMAX Corporation.
4) Inflatable membrane apparatus:
   Membrane: transparent silicone rubber membrane 1.6 mm thick, durometer hardness 40A, tensile strength 5516 kPa and elongation 250%,
   Air pressure: pressure applied to the mold part 10 psi.
5) UV-cure
   light intensity 145 mW/Cu$^2$;
   cure time: 40 seconds.

Results are given in Table III:

TABLE III

Optical properties comparison before and after HMC film transfer onto different curved lenses from thin HMC-PC carriers (0.50 mm)

| Ex. | Lens power | Cylinder | BL or BLR-BLr | BC | Lens Power before BST | Lens Power After BST | Cylinder before BST | Cylinder after BST | Prism before BST | Prism after BST | Overall ISO Performance Z80.1 |
|---|---|---|---|---|---|---|---|---|---|---|---|
| 11 | (+) 4.00 | 0 | 5.40 5.40 | 6 | 4.01 | 3.93 | −0.04 | −0.09 | 0.63 | 0.64 | Good |
| 12 | (+) 3.00 | −2 | 5.70 7.70 | 8 | 3.02 | 3.03 | −1.98 | −2.02 | 0.21 | 0.46 | Good |
| 13 | (+) 1.00 | −2 | 6.20 8.20 | 8 | 0.97 | 1.02 | −1.93 | −1.94 | 0.14 | 0.05 | Good |
| 14 | (−) 1.00 | −2 | 6.60 8.50 | 8 | −1.01 | −1.02 | −2.05 | −2.05 | 0.12 | 0.02 | Good |
| 15 | (−) 3.00 | 0 | 7.70 7.70 | 8 | −2.99 | −2.94 | −0.03 | −0.05 | 0.37 | 0.31 | Good |
| 16 | (−) 4.00 | −2 | 8.50 10.50 | 11 | −4.06 | −4.04 | −1.93 | −1.99 | 0.86 | 0.30 | Good |

BST: Backside transfer

EXAMPLE 17

Examples 11 to 16 are reproduced except polycarbonate lenses were used instead of CR-39 lenses with powers varying from −2.00 to +2.00. The optical and HMC film qualities of the obtained lenses after the coating transfer were the same as in examples 11 to 16.

EXAMPLE 18

Examples 11 to 16 are reproduced except photochromic lenses were used instead of CR-39 lenses. The optical and HMC film qualities of the obtained lenses after the coating transfer were the same as in examples 11 to 16.

EXAMPLES 19 TO 28 AND COMPARATIVE EXAMPLES 1 TO 2

The procedure of examples 11 to 16 was repeated with the following conditions: thin PC carriers of:
a) HMC thin carrier preparation: firstly, different size and base curvature carriers having a thickness of 0.5 mm were prepared by surfacing PC blanks as shown in the following table IV. The PC carrier is made by non-UV absorber PC materials. The peripheral diameter of the carrier is 68 mm.

These carriers were then coated by protective coating, AR coating, hard coating and latex primer coating to make a HMC front-coated carrier for backside coating transferring process.

b) Lens blank preparation: HMC front coated PC SF (semi-finished) lenses with peripheral diameter of 70 mm were back-surfaced to the different powers with different backside base curvatures or base as shown in the same table.

c) BST: the lenses were washed by soap and water and dried and then a small amount of UV acrylic adhesive were dropped on the backside of the lens and the HMC carrier was placed upon the glue. After that, the UV funnel type accumulator apparatus was placed on top of the carrier. The membrane was inflated at a constant pressure of 69 kPa to deform the HMC carrier and spread out the glue liquid to match the backside curvature of the lens, and then a UV light was irradiated from the top (carrier side) for 40 seconds. After UV curing, the lens with HMC carrier stack was edged to remove excess glue on the edge and then the carrier was blown off by air to leave HMC stacked on the backside of the lens. The optical quality and distortion of the obtained lenses with HMC on the backside by BST process was checked by HUMPHERY 350 Power.

The results are given in Table IV:

TABLE IV

| Ex. | PC lens power | Cylinder of PC lens | BL BLR ≈ BLr | BC/HMC Carrier base | Power before BST | Power after BST | Cylinder before BST | Cylinder after BST | Optical distortion after BST |
|---|---|---|---|---|---|---|---|---|---|
| 19 | +2.00 | 0 | 3.6 | 4.1 | +2.04 | +2.02 | 0.04 | 0.06 | Good |
| 20 | +2.00 | 2.00 | 3.6 ≈ 5.5 | 5.5 | +2.04 | +2.11 | 1.99 | 2.05 | Good |
| 21 | +1.00 | 0 | 4.5 | 5.5 | +0.99 | +0.94 | 0.03 | 0.01 | Good |
| 22 | +1.00 | 2.00 | 4.5 ≈ 6.3 | 6.1 | +1.02 | +1.06 | 1.98 | 1.94 | Good |
| 23 | −1.00 | 0 | 5.2 | 5.7 | −0.98 | −1.00 | 0.02 | 0.07 | Good |
| 24 | −1.00 | 2.00 | 5.2 ≈ 7.0 | 7.5 | −1.02 | −0.92 | 1.96 | 2.03 | Good |
| 25 | −2.00 | 0 | 5.1 | 6.1 | −2.05 | −1.95 | 0.02 | 0.05 | Good |
| 26 | −2.00 | 2.00 | 5.1 ≈ 6.9 | 6.5 | −2.00 | −1.93 | 1.99 | 2.01 | Good |
| 27 | −3.00 | 0 | 6.0 | 6.5 | −2.92 | −2.95 | 0.02 | 0.04 | Good |
| 28 | −3.00 | 2.00 | 6.0 ≈ 7.8 | 7.5 | −2.90 | −3.03 | 2.02 | 1.96 | Good |
| Comp. 1 | +1.00 | 2.00 | 4.5 ≈ 6.3 | 4.5 | +1.05 | 2.03 | 2.03 | 3.07 | NG |
| Comp. 2 | 0.00 | 0 | 5.5 | 4.5 | 0.00 | 1.00 | 0.00 | 0.45 | NG |

Comp. 1-2: The carrier base curvature was smaller than the lens back base curvature;
NG: Not good HMC pre-coating of the mold parts of the above examples was as follows, except in example 5 wherein no hard coat and no primer coat is used.

HMC front coated PC SF in examples 19 to 28 are obtained following step 2 and 3 of HMC deposition but with the deposition of each layer being performed in the reverse order (primer/hardcoat/AR layers) i.e. normal order.

Step 1: Protecting and Releasing Coating

The composition of the protecting and releasing coating was as follows:

| Component | Parts by weight |
|---|---|
| PETA LQ (acrylic ester of pentaerythritol) | 5.00 |
| Dowanol PnP | 5.00 |
| Dowanol PM | 5.00 |
| n-propanol | 5.00 |
| 1360 (Silicone Hexa-acrylate, Radcure) | 0.10 |
| Coat-O-Sil 3503 (reactive flow additive) | 0.06 |
| Photoinitiator | 0.20 |

The PC mold parts are cleaned using soap water and dried with compressed air. The mold part convex surfaces are then coated with the above protecting coating composition via spin coating with application speed of 600 rpm for 3 seconds and dry speed of 1200 rpm for 6 seconds. The coating was cured using Fusion System H+ bulb at a rate of 1.524 m/minute (5 feet per minute).

Step 2: Anti-Reflective (AR) Coating

The PC mold parts after deposition of the protecting coating was vaccum coated as follows:

A/ Standard Vacuum AR Treatment: The Vacuum AR treatment is accomplished in a standard box coater using well known vacuum evaporation practices. The following is one procedure for obtaining the VAR on the mold:

1. The molds having the protective coating already applied on the surface, are loaded into a standard box coater and the chamber is pumped to a high vacuum level.
2. Hydrophobic coating (Chemical=Shin Etsu KP801M) is deposited onto the surface of the molds using a thermal evaporation technique, to a thickness in the range of 2-15 nm.
3. The dielectric multilayer AR coating, consisting of a stack of sublayers of high and low index materials is then deposited, in reverse of the normal order. Details of this deposition are as such:

The optical thicknesses of the alternating low and high index layers are presented in the table:

| Low index | 103-162 nm |
|---|---|
| High index | 124-190 nm |
| Low index | 19-37 nm |
| High index | 37-74 nm |

B/ At the completion of the deposition of the four-layer anti-reflection stack, a thin layer of $SiO_2$, comprising of a physical thickness of 1-50 nm, is deposited. This layer is to promote adhesion between the oxide anti-reflection stack and a laquer hard-coating which will be deposited on the coated mold at a later time.

Step 3: Hard Coat (HC) & Latex Primer Coating

The composition of the hardcoating was as follows:

| Component | Parts by weight |
|---|---|
| Glymo | 21.42 |
| 0.1N HCl | 4.89 |
| Colloidal silica | 30.50 |
| Methanol | 29.90 |
| Diacetone alcohol | 3.24 |
| Aluminium acetylacetonate | 0.45 |
| Coupling agent | 9.00 |
| Surfactant FC-430 (3M company) | 0.60 |

The composition of the primer was as follows:

| Component | Parts by weight |
|---|---|
| Polyurethane latex W-234 | 35.0 |
| Deionized water | 50.0 |
| 2-Butoxy ethanol | 15.0 |
| Coupling agent | 5.00 |

The PC mold parts after deposition of protecting coating and AR coating in Steps 1 and 2 are then spin coated by HC solution at 600 rpm 1200 rpm, and precured 10 minutes at 80° C., and again spin coated by latex primer solution at the same speed and postcuring for 1 hour at 80° C.

The coupling agent is a precondensed solution of:

| Component | Parts by weight |
|---|---|
| GLYMO (Glycidoxypropyltrimethoxysilane) | 10 |
| Acryloxypropyltrimethoxysilane | 10 |
| 0.1 N HCl | 0.5 |
| Aluminium acetylacetonate | 0.5 |
| Diacetone alcohol | 1.0 |

The invention claimed is:

1. A process for transferring a coating onto at least one geometrically defined surface of a lens blank which comprises:

providing a lens blank having at least one geometrically defined surface;

providing a flexible mold part having an internal surface bearing a coating and an external surface, the internal surface being conformable to the geometrically defined surface of the lens blank when brought into contact therewith;

depositing on said geometrically defined surface of said lens blank or said coating a pre-measured amount of a curable glue;

moving relatively to each other the lens blank and the flexible mold part to either bring the coating into contact with the curable glue or bring the curable glue into contact with the geometrically defined surface of the lens blank;

applying a sufficient pressure onto the external surface of the flexible mold part so that the thickness of a final glue layer after curing is less than 100 micrometers;

curing the glue; and withdrawing the flexible mold part to recover the lens blank with the coating adhered onto the geometrically defined surface thereof.

2. The process of claim 1, wherein the flexible mold part is urged against the lens blank by means of an inflatable membrane.

3. The process of claim 2, wherein the geometrically defined surface of the lens blank is a back spherical surface and the base curvature of the flexible mold (BC) and the base curvature of the spherical surface of the lens blank (BL) fulfill the relationship 0<BC−BL<1.5.

4. The process of claim 3, wherein 0.2<BC−BL<1.

5. The process of claim 2, wherein the geometrically defined surface of the lens blank is a back cylindric surface and the base curvature of the flexible mold (BC) and the base curvatures of the cylindric surface of the lens blank ($BL_R$, $BL_r$) fulfill the relationship $BL_R$<$BL_r$ and $$a) \text{ if } BLr - BL_R \le 3.5$$
$$\left. \begin{array}{c} 0 < BC - BL_R < 3 \\ |BC - BLr| < 1 \end{array} \right\}.$$
$$b) \text{ if } BLr - BL_R > 3.5$$
$$BL_R < BC < BLr$$

6. The process of claim 5, wherein in (a)

$$\left. \begin{array}{c} 0.2 < BC - BL_R < 2.5 \\ |BC - BLr| < 0.5 \end{array} \right\}.$$

7. The process of claim 1, wherein the flexible mold part is made of plastic material.

8. The process of claim 1, wherein the flexible mold part is made of polycarbonate.

9. The process of claim 1, wherein the flexible mold part has a thickness of 0.3 to 5 mm.

10. The process of claim 1, wherein the geometrically defined surface of the lens blank is an optical surface.

11. The process of claim 1, wherein the geometrically defined surface of the lens blank has a roughness Sq ranging from $10^{-3}$ to 1 µm.

12. The process of claim 1, wherein the thickness of the final cured glue layer is less than 80 µm.

13. The process of claim 1, wherein the thickness of the final cured glue layer is less than 50 µm.

14. The process of claim 1, wherein the thickness of the final cured glue layer ranges from 1 to 30 µm.

15. The process of claim 1, wherein the applied pressure ranges from 5 to 50 Psi.

16. The process of claim 1, wherein the coating comprises an anti-reflective coating layer, an anti-abrasion coating layer, an impact resistant coating layer, a printed layer, a photochromic coating layer, a dyeing coating layer, a polarized coating layer, or a stack of two or more of these coating layers.

17. The process of claim 16, wherein the coating has a thickness of 50 micrometers or less.

18. The process of claim 1, wherein the lens blank is a semi-finished lens having one face already provided with a coating.

19. The process of claim 18, wherein the face already provided with a coating is the front face of the lens and the geometrically defined surface onto which the coating is transferred is the back surface of the lens.

20. A process for transferring coatings onto geometrically defined surfaces of a lens blank which comprises:

providing a lens blank having two geometrically defined surfaces;

providing two separate flexible mold parts having each an internal surface conformable to a geometrically defined surface of the lens blank upon closure of the mold parts and an external surface;

forming a coating on each of the internal surfaces of said flexible mold parts;

depositing on the geometrically defined surfaces of the lens blank or on the coatings a pre-measured amount of a thermally curable or photo curable glue;

closing the flexible mold parts onto the lens blank;

applying a pressure on the external surface of at least one flexible mold part to spread the glue amounts so that the thickness of final cured glue layers is less than 100 µm;

curing the glue; and withdrawing the flexible mold parts to recover the lens blank with coatings adhered onto each of its geometrically defined surfaces.

21. The process of claim 20, wherein the flexible mold parts are made of a plastic material.

22. The process of claim 21, wherein the flexible mold parts are made of polycarbonate.

23. The process of claim 20, wherein the flexible mold parts have a thickness of 0.3 to 5 mm.

24. The process of claim 20, wherein the geometrically defined surface of the lens blank is an optical surface.

25. The process of claim 20, wherein the geometrically defined surface of the lens blank has a roughness Sq ranging from $10^{-3}$ to 1 µm.

26. The process of claim 20, wherein the thickness of the final cured glue layer is less than 80 µm.

27. The process of claim 20, wherein the thickness of the final cured glue layer is less than 50 µm.

28. The process of claim 20, wherein the thickness of the final cured glue layer ranges from 1 to 30 µm.

29. The process of claim 20, wherein the applied pressure ranges from 5 to 50 Psi.

30. The process of claim 29, wherein the applied pressure ranges from 5 to 20 Psi.

31. The process of claim 20, wherein the coatings comprise an anti-reflective coating layer, an anti-abrasion coating layer, an impact resistant coating layer, a polarized coating layer, a photochromic coating layer, a dyeing coating layer, a printed layer, or a stack of two or more of these coating layers.

32. The process of claim 31, wherein the coatings have a thickness of less than 50 micrometers.

33. The process of claim 1, wherein the flexible mold part has a thickness of 0.2 to 5 mm.

34. The process of claim 1, wherein the flexible mold part has a thickness of 0.3 to 1 mm.

35. The process of claim 8, wherein the flexible mold part has a thickness of 0.5 to 1 mm.

36. The process of claim 1, wherein the flexible mold part has a thickness of 1 mm or less.

37. The process of claim 20, wherein the flexible mold parts have a thickness of 1 mm or less.

38. The process of claim 20, wherein the flexible mold parts have a thickness of 0.2 to 5 mm.

39. The process of claim 20, wherein the flexible mold parts have a thickness of 0.3 to 1mm.

40. The process of claim 22, wherein the flexible mold parts have a thickness of 0.5 to 1mm.

41. The process of claim 20, wherein a geometrically defined surface of the lens blank onto which a coating is transferred is a back spherical surface and the base curvature of the corresponding flexible mold part (BC) and the base curvature of said spherical surface of the lens blank (BL) fulfill the following relationships:

$$0<BC-BL<1.5.$$

42. The process of claim 41, wherein $0.2<BC-BL<1$.

43. The process of claim 20, wherein a geometrically defined surface of the lens blank onto which a coating is transferred is a back cylindrical surface and the base curvature of the corresponding flexible mold part (BC) and the base curvatures of said cylindrical surface of the lens blank (BLR, BLr) fulfill the following relationships:

BLR <BLr and
 a) if BLr−BLR≦3.5 0<BC−BLR<3 and |BC−BLr|<1
 b) if BLr−BLR>3.5 BLR<BC<BLr.

44. The process of claim 43, wherein in (a):

$$0.2<BC-BLR<2.5 \text{ and } |BC-BLr|<0.5.$$

45. A process for transferring a coating onto at least one geometrically defined surface of a lens blank which comprises:
 providing a lens blank having at least one geometrically defined surface;
 providing a flexible mold part having (i) an external surface and (ii) an internal surface bearing a coating and a pre-measured amount of a thermally curable or photocurable glue deposited on said coating, the internal surface being conformable to the geometrically defined surface of the lens blank when brought into contact therewith;
 moving relatively to each other the lens blank and the flexible mold part to either bring the coating into contact with the curable glue or bring the curable glue into contact with the geometrically defined surface of the lens blank;
 applying a sufficient pressure onto the external surface of the flexible mold part so that the thickness of a final glue layer after curing is less than 100 μm;
 curing the glue; and
 withdrawing the flexible mold part to recover the lens blank with the coating adhered onto the geometrically defined surface thereof.

46. The process of claim 45, wherein the coating comprises an anti-reflective coating layer, an anti-abrasion coating layer, an impact resistant coating layer, a polarized coating layer, a photochromic coating layer, a dyeing coating layer, a printed layer, or a stack of two or more of these coating layers.

47. The process of claim 46, wherein the coating has a thickness of 50 μm or less.

48. The process of claim 45, wherein the flexible mold part is made of plastic material.

49. The process of claim 45, wherein the flexible mold part is made of polycarbonate.

50. The process of claim 45, wherein the flexible mold part has a thickness of 0.3 to 1 mm.

51. The process of claim 45, wherein the geometrically defined surface of the lens blank is an optical surface.

52. The process of claim 45, wherein the geometrically defined surface of the lens blank has a roughness Sq ranging from $10^{-3}$ to 1 μm.

53. The process of claim 45, wherein the thickness of the final cured glue layer is less than 80 μm.

54. The process of claim 53, wherein the thickness of the final cured glue layer is less than 50 μm.

55. The process of claim 45, wherein the thickness of the final cured glue layer ranges from 1 to 30 μm.

56. The process of claim 45, wherein the applied pressure ranges from 5 to 30 Psi.

\* \* \* \* \*

UNITED STATES PATENT AND TRADEMARK OFFICE
CERTIFICATE OF CORRECTION

PATENT NO. : 7,455,796 B2
APPLICATION NO. : 10/482722
DATED : November 25, 2008
INVENTOR(S) : Peiqi Jiang et al.

Page 1 of 1

It is certified that error appears in the above-identified patent and that said Letters Patent is hereby corrected as shown below:

In claim 43, column 21, line 14, delete "BLr-BLR $\leq$ 3.5 0 < BC-BLR < 3" and insert --BLr-BLR $\leq$ 3.5; 0 < BC-BLR < 3-- therefor.

In claim 43, column 21, line 15, delete "BLr-BLR > 3.5 BLR < BC < BLr" and insert --BLr-BLR > 3.5; BLR < BC < BLr-- therefor.

Signed and Sealed this

Third Day of March, 2009

JOHN DOLL
*Acting Director of the United States Patent and Trademark Office*